United States Patent Office 3,496,233
Patented Feb. 17, 1970

3,496,233
PRODUCTION OF UNSATURATED ALDEHYDES
John Bohemen, Leatherhead, Frank Christopher Newman, Great Bookham, and Barrie Wood, Leatherhead, England, assignors to BP Chemicals (U.K.) Limited, London, England, a British company
No Drawing. Original application Mar. 15, 1965, Ser. No. 439,952, now Patent No. 3,408,400, dated Oct. 29, 1968. Divided and this application June 5, 1968, Ser. No. 734,557
Claims priority, application Great Britain, Apr. 1, 1964, 13,510/64
Int. Cl. C07c 45/02
U.S. Cl. 260—604                        23 Claims

ABSTRACT OF THE DISCLOSURE

Process for the preparation of acrolein and methacrolein from propylene and isobutene, respectively, in the vapour phase via reaction of the olefines with molecular oxygen over an oxide composition containing antimony, tin and polyvalent metal, among which are iron, chromium, copper, manganese, titanium, molybdenum, vanadium, tungsten, cobalt, uranium and nickel.

---

This is a divisional application of copending application U.S. Ser. No. 439,952, filed Mar. 15, 1965.

The present invention relates to the preparation of unsaturated aliphatic aldehydes, and more particularly to the preparation of acrolein and methacrolein.

According to the present invention a process for the production of acrolein or methacrolein comprises reacting at an elevated temperature in the vapour phase propylene or isobutene with molecular oxygen over an oxide composition containing antimony, tin and a polyvalent metal as an oxidation catalyst.

The oxide composition may be regarded either as an admixture of antimony and tin oxides with a polyvalent metal oxide or as an oxygen-containing compound of antimony, tin and the polyvalent metal; under the reaction conditions the composition may contain either or both forms.

The proportions of the various components of the catalyst may vary within moderately wide limits. The atomic ratio of antimony/tin can be for instance from 1:10 to 10:1. The amount of polyvalent metal present is not critical, and may vary between about 0.5% and about 30% molar based on the total composition. Concentrations between 1% and 15% are particularly preferred in catalysts which contain antimony and tin in the atomic ratio of 4:1. Particularly suitable polyvalent metals are iron, chromium, copper, manganese, titanium, molybdenum, vanadium, tungsten, cobalt, uranium and nickel.

In preparing these catalysts it is particularly preferred to ensure that the mixed oxide composition before being dried or heat-treated, contains neither acids nor bases, free or combined, which might be capable of further reaction with a portion of the additional metal or metals to form a soluble compound, during further processing. Any such acidic or basic materials present in the composition may be removed by either extended washing with hot water or by forming a slurry with water and adjusting the pH to about 7 by addition of a base such as ammonia.

The oxide composition catalysts may be prepared in various ways. For instance, the antimony, tin and additional polyvalent metal or metals may be co-precipitated from a mixed aqueous solution of their soluble salts, for example the chlorides. In this case the precipitation of the hydroxides is carried out by addition of ammonia. The precipitate is then thoroughly washed with water to remove soluble salts, for example ammonium chloride.

Alternatively, an antimony/tin oxide composition may first be prepared, and the additional polyvalent metal or metals subsequently incorporated. The antimony/tin oxide composition may be prepared by co-precipitation as before, or by intimately mixing one or more oxides of antimony, such as the trioxide, tetroxide or pentoxide, or a hydrated oxide, with one or more hydrated oxides of tin. Mixtures of the hydrated oxides, formed for example by the action of aqueous nitric acid or antimony and tin metals, or on mixtures of the metals, are preferred. The additional polyvalent metal or metals may then be added to the mixture, for instance as an insoluble neutral compound which is convertible to the oxide on heating. Examples of such insoluble neutral compounds are the hydroxides, carbonates and hydrated oxides.

Alternatively, the additional polyvalent metal or metals may be added to the antimony/tin oxide composition in the form of a soluble salt, such as a nitrate, formate, acetate, chloride or sulphate, and the mixture then neutralized with a base such as ammonia to precipitate the oxide. In this case, removal of residual nitrate from the antimony/tin oxide composition can suitably be carried out at the same time as the neutralization of the third component metal salt.

After mixing of the oxides, the composition is subjected to a heat treatment in molecular oxygen, for instance at a temperature in the range 550° to 1100° C., and preferably between 700° and 850° C. The time of heating is not critical and may be, for example, from about 10 hours to about 40 hours.

After this heat-treatment, it is particularly preferred to subject the catalyst to a further treatment by heating in aqueous nitric or hydrochloric acid at about 100° C. The time of heating is not critical, and may, for example, vary between about ten minutes and six hours. A period of about three hours is preferred. The catalyst is then washed with water and dried at about 110° prior to use.

The catalyst may, if desired, be deposited on supports such as pumice, silica, Carborundum or titania.

EXAMPLE I 59.3 parts of powdered tin were fed over a period of 10 minutes to a stirred mixture of 500 parts of water and 370 parts of concentrated nitric acid (68%) at 100°; 1420 parts of concentrated nitric acid (68%) were then added and the mixture heated to 103° C. 243.5 parts of powdered antimony were then introduced during 20 minutes, the mixture boiled for a further 7 minutes (111° C.), cooled to 40° C. and filtered. The solid was stirred with 1500 parts of cold water for 15 minutes, filtered then boiled with 2000 parts of water for one hour, cooled to 40° C., filtered and finally stirred with 1500 parts of cold water for 5 minutes. This suspension of oxides was mixed with a solution of uranium oxide ($U_3O_8$, 0.125 g. atoms U) in 60% nitric acid at 70° C.

Dilute ammonia solution was added to the slurry until the pH rose to 6.5 when the precipitate was collected, washed well with distilled water and dried at 140° C. The dried powder was ground to −30 mesh; 1% by weight of graphite was added, and the mixture pelleted (3 mm.). The pellets were heat-treated in a stream of air at 925° for 16 hours, the temperature of furnace being raised from 250°–925° C. at 20° per hour.

A feed of 10% propylene, 60% air, and 30% steam was passed over the catalyst at 473° C. and at a contact time of 4 seconds. Of the propylene fed, 45.7% was converted to acrolein, 9.5% to carbon dioxide and 34.8% was recovered unchanged.

EXAMPLE II

A suspension of oxides prepared from powdered tin an antimony metals according to Example I containing 1.3 gram atoms of antimony and 0.3 gram atoms of tin was mixed with a solution of vanadium pentoxide ($V_2O_5$, 0.3 gram atoms of vanadium) in 35% w./w. hydrochloric acid (containing a little ethanol).

Dilute ammonia solution was added until the pH rose to 6.0 when the precipitate was collected, washed, dried and pelleted as described in Example I.

The pellets were heated in a stream of air at 890° C. for 16 hours, the temperature of the furnace being raised from 250°–890° C. at 20° per hour.

The catalyst was operated in an isothermal reactor maintained at 415° C. with a feed consisting of 10% propylene, 60% air and 30% steam at a contact time of 4 seconds. Of the propylene fed, 12.5% was converted to acrylic acid, 33% was converted to acrolein, 3.8% to carbon dioxide and 45% was recovered unchanged.

EXAMPLE III

Antimony pentachloride (595 parts by weight) was added slowly to a mixture of distilled water (2,000 parts by weight), stannic chloride (130 parts by weight) and cupric chloride (43 parts by weight). After the mixture had been stirred for 70 minutes, ammonia solution (S.G. .880) was added until the pH reached 6.0.

The precipitate was filtered off, thoroughly washed by resuspension in distilled water and dried at 115° C. After grinding the mixture to less than 30 mesh, 1% by weight of graphite was added and the powder pelleted (3 mm.). The pellets were heat treated in a stream of air; the furnace temperature being raised from 200° C. to 850° C. at 21° per hour and maintained at 850° C. for 16 hours.

A gaseous mixture of 5.3% propylene, 58.5% air and 36.2% steam was passed over this catalyst at 480° C. and 4.3 seconds contact time. Of the propylene fed, 40% was converted to acrolein, 23.9% to carbon dioxide and 26.7% was recovered unchanged.

EXAMPLE IV

A catalyst with molar ratios of iron:tin:antimony of 1:1:8 was prepared as follows:

Tin (119 parts by weight) and antimony (976 parts by weight) were reacted with nitric acid and washed as described in Example I. A solution of ferric nitrate hexahydrate (350 parts by weight) in water (500 parts by weight) was added to the oxide mixture, and aqueous ammonia (d. 9.880, 176 g.) stirred in. The mixture was stirred for 30 minutes, filtered, washed three times with water (2,000 parts by weight), dried and pelleted. The pellets were heat treated in air at 900° C. for 16 hours; the furnace temperature being increased to this level at the rate of 21° per hour. A feed of 10% propylene, 50% air and 40% steam was passed over this catalyst at 460° C. and 4 seconds contact time. Of the propylene fed, 39% was converted to acrolein, 9% to carbon dioxide and 44% was recovered unchanged.

A catalyst prepared similarly, but with the molar ratio of iron:tin:antimony of 1:4.5:4.5 yielded 37% acrolein and 10% carbon dioxide under similar reaction conditions.

What is claimed is:

1. A process for the production of a substance selected from the group consisting of acrolein and methacrolein which comprises reacting at an elevated temperature in the vapor phase an olefine selected from the group consisting of propylene and isobutene with molecular oxygen over an oxide composition containing antimony, tin and copper, 2. A process as claimed in claim 1 wherein the atomic ratio of antimony to tin is within the range 1:10 to 10:1.

3. A process as claimed in claim 1 wherein the amount of copper is between about 0.5% and about 30% molar based on the total composition.

4. A process as claimed in claim 1 wherein the atomic ratio of antimony to tin is 4:1 and the amount of copper is between 1 and 15% molar based on the total composition.

5. A process as claimed in claim 1 wherein the oxide composition is heated before use as a catalyst to a temperature in the range 550–1100° C. in a molecular oxygen containing gas.

6. A process as claimed in claim 5 wherein the oxide composition is heated before use as a catalyst to a temperature between 700 and 850° C.

7. A process as claimed in claim 5 wherein the oxide composition is prepared by co-precipitation of heat-decomposable compounds of antimony, tin and copper from a mixed aqueous solution of the soluble salts of the metals.

8. A process as claimed in claim 7 wherein the soluble salts of the metals are the chlorides and the precipitation of the hydroxide is effected by the addition of ammonia to the mixed aqueous solution.

9. A process as claimed in claim 5 wherein the oxide composition is prepared by co-precipitation of heat-decomposable compounds of antimony and tin from a mixed aqueous solution of their soluble salts followed by addition of a heat-decomposable insoluble neutral compound of copper to the precipitate.

10. A process as claimed in claim 9 wherein the insoluble neutral compound is a hydroxide, carbonate or hydrated oxide.

11. A process as claimed in claim 5 prepared by co-precipitation of tin and antimony metals from a mixed aqueous solution of their soluble salts followed by addition of a heat-decomposable soluble salt of copper to the precipitate.

12. A process as claimed in claim 11 wherein the soluble salt is a nitrate, formate, acetate, chloride or sulphate.

13. A process as claimed in claim 5 wherein the oxide composition before drying or otherwise heat-treating is washed with hot water to remove residual acidic or basic material.

14. A process as claimed in claim 5 wherein the oxide composition before drying or otherwise heat-treating, is slurried with water and the pH of the slurry adjusted if necessary to 7 by addition of a base to remove residual acidic or basic material.

15. A process as claimed in claim 5 wherein the oxide composition is heated before use in aqueous nitric or hydrochloric acid at 100° C. followed by water washing and drying.

16. A process as claimed in claim 1 wherein the oxide composition is deposited on a pumice, silica, Carborundum or titania support.

17. A process as claimed in claim 1 wherein the concentration of olefine in the feed is between 2 and 10% by volume.

18. A process as claimed in claim 1 wherein the concentration of oxygen in the feed is between 2 and 15% by volume.

19. A process as claimed in claim 1 carried out in the presence as diluent of a gas selected from the group consisting of nitrogen, propane, butane, isobutane, carbon dioxide, steam and mixtures thereof.

20. A process as claimed in claim 19 wherein the diluent is a mixture of steam and nitrogen.

21. A process as claimed in claim 20 wherein the concentration of steam is between 10 and 60% by volume of the feed.

22. A process as claimed in claim 1 carried out between 300 and 500° C.

23. A process as claimed in claim 1 carried out with a contact time between 1 and 5 seconds.

References Cited

UNITED STATES PATENTS 3,338,952  8/1967  Callahan et al. ____ 260—604 X
3,326,819  6/1967  Newman _____ 260—604 X LEON ZITVER, Primary Examiner
R. H. LILES, Assistant Examiner U.S. Cl. X.R.

252—456, 459; 260—533